United States Patent [19]

Hohman et al.

[11] 4,409,742
[45] Oct. 18, 1983

[54] APPARATUS FOR PREDRYING PELLETIZED MATERIAL

[75] Inventors: Charles M. Hohman, Granville; Mark A. Propster, Gahanna; Stephen Seng, Frazeysburg, all of Ohio

[73] Assignee: Owens-Corning Fiberglas Corporation, Toledo, Ohio

[21] Appl. No.: 344,343

[22] Filed: Feb. 1, 1982

Related U.S. Application Data

[62] Division of Ser. No. 216,465, Dec. 15, 1980, Pat. No. 4,332,603.

[51] Int. Cl.³ .............................................. F26B 17/26
[52] U.S. Cl. ........................................ 34/168; 34/171; 65/335
[58] Field of Search .......................... 65/27, 134, 335; 106/DIG. 8; 34/168, 171, 33

[56] References Cited

U.S. PATENT DOCUMENTS

| | | | |
|---|---|---|---|
| 2,275,116 | 3/1942 | Vogel-Jorgensen | 34/168 |
| 3,432,397 | 3/1969 | Berg | 34/33 X |
| 4,225,332 | 9/1980 | Tsay | 65/134 |
| 4,238,216 | 12/1980 | Nevard | 65/134 |
| 4,248,616 | 2/1981 | Seng et al. | 65/335 |

Primary Examiner—Richard V. Fisher
Attorney, Agent, or Firm—R. G. Hudgens; P. R. Cloutier; P. P. Pacella

[57] ABSTRACT

Apparatus for predrying and preheating pellets involving an oscillating grate extending angularly downward across the predrying section and discharging into a preheating section. The grate is substantially equal in width to the width of the predrying section so that the gas flow area through the predrying section is substantially less than the gas flow area through the preheating section. Further, the grate includes a plurality of spaced members positioned to form a gas flow velocity therethrough greater than the gas flow velocity through the preheating section.

4 Claims, 2 Drawing Figures

APPARATUS FOR PREDRYING PELLETIZED MATERIAL

This is a division of application Ser. No. 216,465, filed Dec. 15, 1980, now U.S. Pat. No. 4,332,603.

TECHNICAL FIELD

This invention pertains to method and apparatus for predrying pelletized materials.

In one of its more specific applications, this invention pertains to the predrying of pelletized glass batch which is employed in the production of glass fibers.

BACKGROUND OF THE INVENTION

In many processes, including the production of glass, both plate glass and glass fibers, it is conventional to pelletize the particulate matter employing an aqueous pelletizing solution. The pellets are then dried and preheated prior to introduction into the furnace in which they are melted to form, in the glass art, molten glass from which the glass product, such as glass fibers, is produced.

The steps of drying and preheating the glass pellets are generally undertaken in two individual sections of a chamber. In the uppermost section, the pellets are dried under conditions which prevent their agglomeration. In the lower section, the substantially dry pellets are preheated to as high a temperature as feasible in consideration of the temperature of the gas stream with which they are contacted. Generally, the drying and preheating steps are carried out in superimposed beds in which there may, or may not, be a difference in regard to pellet movement, gas velocities, gas characteristics, and the like. However, due to the differences in what is sought to be accomplished in the drying step, either partial or complete, and the preheating step, it is often desirable to provide individual contact conditions in the two steps rather than to employ a conventional downward-moving bed in both steps. The method and apparatus of the present invention are directed to providing individual, different contact conditions in the drying and preheating steps of processing pellets of all kinds.

STATEMENT OF THE INVENTION

According to the method of this invention, there is provided a method of producing molten glass which comprises forming the glass batch into pellets employing a pelletizing solution, introducing the wet pellets into a predrying zone, passing the pellets through the predrying zone to dry the pellets while imparting an oscillating or vibratory motion to the pellets, contacting the pellets within the predrying zone with first gases at a first velocity, passing the pellets onto a bed within a preheating zone, contacting the pellets within the preheating zone with second gases at a velocity less than the first velocity to preheat the pellets, and melting the preheated pellets to form molten glass.

In another embodiment of the invention, the pellets are passed angularly through the predrying zone, the angle being less than their angle of repose.

In another aspect of this invention, there is provided a chamber comprising a low section and an upper section of smaller diameter than the lower section, the sections being in open communication, oscillating means positioned in the upper section and conduit means opening from the discharge of the oscillating means into the lower section.

DESCRIPTION OF THE DRAWINGS

The method and apparatus of this invention will be more easily understood if explained in conjunction with the attached drawings in which.

DETAILED DESCRIPTION

Figure 1:
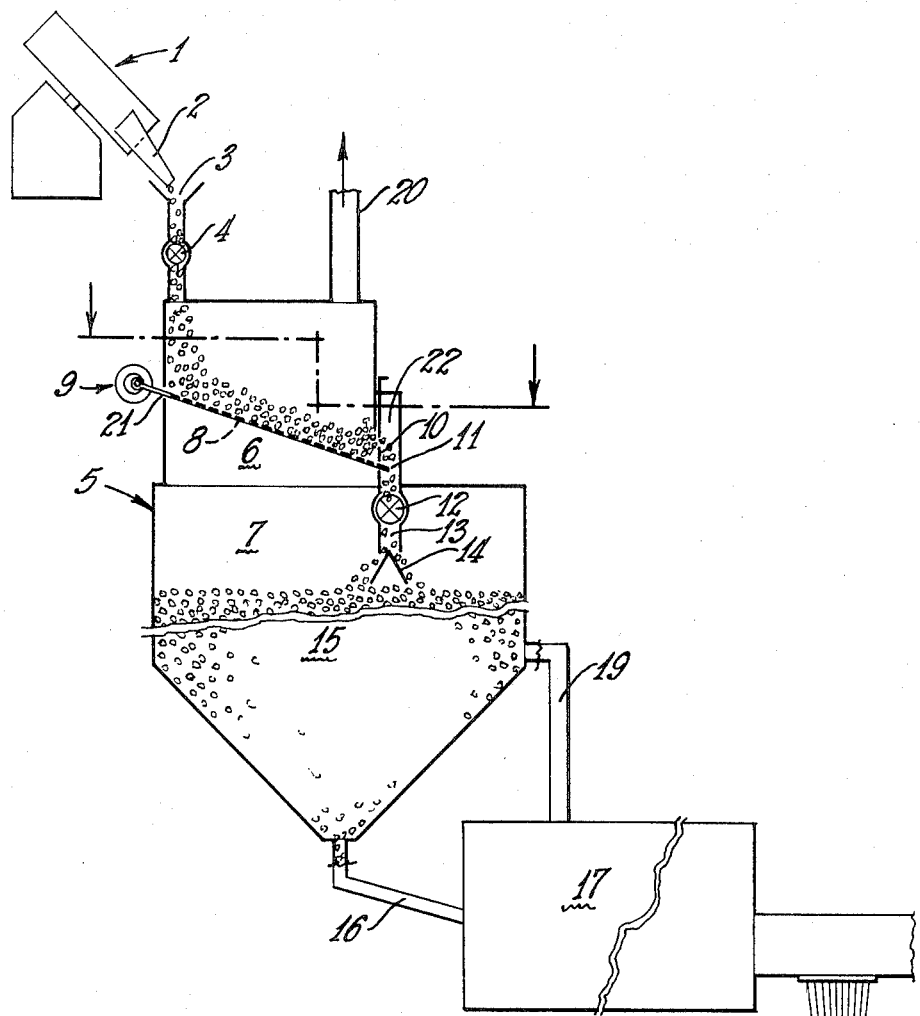
FIG. 1 is a schematic elevational view of the apparatus of this invention.

Referring now to FIG. 1, there is shown pelletizer 1 in which glass batch pellets will be formed employing any suitable pelletizing agent and from which pelletizer they will be fed through conduit 2 into inlet 3 of contactor 5. Contactor 5 will be comprised of upper predrying section 6 and lower preheating section 7. Positioned in inlet 3 will be feeder 4 which acts to seal off inlet 3 to prevent the exit of upwardly-moving hot gases therethrough.

Feeder 4 will be any suitable substantially gas-tight seal which can be regulated to feed pellets into the predrying section either continuously or intermittently. Preferably, it will be comprised of a sectionalized circular member in which sections the pellets are accumulated and from which they can be discharged as desired into the predrying section.

Positioned to receive pellets from the feeder will be oscillating grate 8. This grate will be comprised of a series of spaced members supported, for example, on a gas-penetrable, flexible, chain mat enabling reciprocating oscillation along its length by drive means 9. Feeder 4 will be positioned to discharge at the uppermost end of the grate and the grate will be inclined across the predrying section at an angle slightly less than the angle of repose of the pellets. By so doing, pellet motion across the drying section will not be continuous unless the oscillating action of the grate is continuous. Furthermore, the rate of passage of the pellets through the predrying section can be made independent of the rate of passage of the pellets through the preheating section. For example, if longer periods of contact between the hot gases and the pellets are desired in the predrying section, the oscillation frequency of the grate is decreased since, in the absence of oscillation of the grate, substantially no pellet motion will take place across the predrying section.

Figure 2:
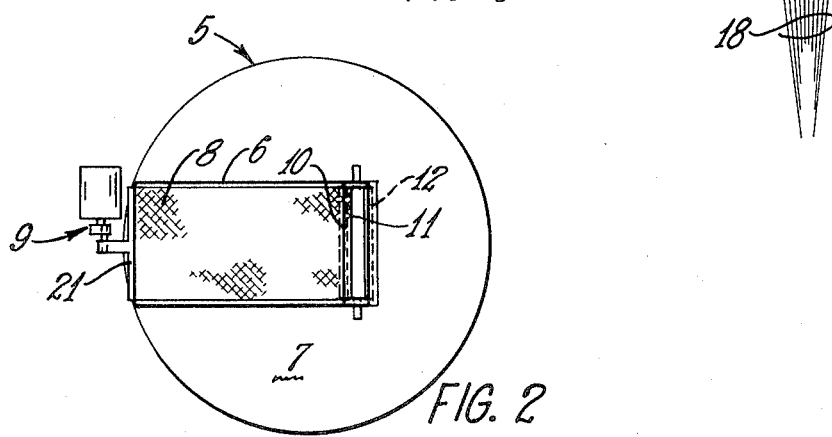
FIG. 2 is a cross-sectional view through 2—2 of FIG. 1.

As shown in FIG. 2, the dimension of the predrying section will be approximately equal in width to the width of the grate, such that the overall flow area of the hot gases in the predrying section will be considerably less than the flow area of the hot gases in the preheating section with the result that the gases reach an increased second velocity in the predrying section. Due to the spaced member construction of the oscillating grate, which members will further reduce the flow area for the hot gases across the grate, the velocity of the hot gases which contact the pellets on the grate is significantly increased to a third velcity which is greater than that in either the preheating section or at the entrance to the predrying section. This, coupled with the turning action imparted to the pellets as they proceed downwardly across the predrying section, will significantly increase the quantity of gases contacting each pellet, the total area of the pellet contacted, and the velocity at which such contact will be made. The net result will be significantly higher heat transfer efficiency within the predrying section of the contactor, and its operation will insure that free flowing pellets will be fed into the preheat hopper stage.

The grade will be sealed at its upper end 21 and can be provided with a gate 10 at its lower end 11 such that a minimum pellet level can be maintained on the grate at all times except that, as desired, gate 10 can be periodically lowered to allow those pellets on the surface of the grate to be discharged therefrom.

The predried pellets will be discharged from the lower end of the grate and will pass through conduit section 22 onto feeder 12 which will operate in a manner comparable to the feeder 4. As with feeder 4, feeder 12 will provide a seal preventing the flow of gases up through conduit section 22.

The predried pellets will leave feeder 12 and pass through conduit means 13 onto distributor 14 which will aid in distributing the pellets across the pellet bed standing in the preheating section 15 of the contactor. In the preheating section, the predried pellets will be contacted with hot gases, preferably introduced through conduit 19.

The predried and preheated pellets will be discharged from the contactor through conduit 16 into furnace 17 wherein the pellets will be melted to form molten glass which is drawn as fibers 18.

The hot flue gases introduced through conduit 19, after passing upward through the preheating section and predrying section, will leave the system to disposal through conduit 20.

It will be evident from the foregoing that various modifications can be made to this invention. Such, however, are considered within the scope of the invention.

We claim:

1. Apparatus for drying glass batch pellets comprising:
   a. a chamber comprised of a predrying section and a preheating section;
   b. gas conduit means opening into said preheating section and gas conduit means opening from said predrying section;
   c. pellet introduction conduit means opening into said predrying section and pellet removal conduit means opening from said preheating section; and,
   d. an oscillating grate positioned in open communication between said pellet introduction conduit means and said predrying section, said grate being substantially equal in width to the width of the predrying section, the gas flow area through said predrying section being substantially less than the gas flow area through said preheating section.

2. The apparatus of claim 1 in which said grate is comprised of a plurality of spaced members positioned to form a gas flow velocity therethrough greater than the gas flow velocity through said preheating section and greater than the gas flow velocity at the entrance to said predrying section.

3. The apparatus of claim 2 in which said grate has a gate at its lower end, said gate being adapted to maintain a level of pellets on said grate.

4. The apparatus of claim 3 in which said gate comprises lowering means to discharge said pellets from said grate.

* * * * *